United States Patent [19]

Buffington et al.

[11] Patent Number: 4,798,460
[45] Date of Patent: Jan. 17, 1989

[54] METHOD AND APPARATUS FOR DETECTING AND MODIFYING PERIPHERAL CURVES AND JUNCTION RIDGES IN CONTACT LENSES

[76] Inventors: Robert D. Buffington, 3806 Winding Creek Rd., Sacramento, Calif. 95825; Joseph Y. Lilley, 1415 40th St., Sacramento, Calif. 95819

[21] Appl. No.: 928,481

[22] Filed: Nov. 7, 1986

[51] Int. Cl.⁴ .................................................. G01B 9/00
[52] U.S. Cl. ..................................................... 356/124
[58] Field of Search ......................... 51/284 E, 284 R; 351/160 R, 177; 356/124, 376

[56] References Cited

U.S. PATENT DOCUMENTS

| | | | |
|---|---|---|---|
| 3,369,329 | 2/1968 | Beiman | 351/177 X |
| 3,722,143 | 3/1973 | Cottom | 351/177 X |
| 3,738,204 | 6/1973 | Spriggs | 351/177 X |
| 3,794,429 | 2/1974 | Koeniger | 356/124 |
| 3,810,403 | 5/1974 | Ianuzzi et al. | 351/177 X |
| 4,149,801 | 4/1979 | Volk | 356/124 |
| 4,545,678 | 10/1985 | Grimm et al. | 356/124 |

Primary Examiner—Gene Wan
Attorney, Agent, or Firm—Lothrop & West

[57] ABSTRACT

Apparatus and method for detecting and modifying discontinuities on the ocular surface of a patient's contact lens by alternately observing the reflected image of one or more parallel opaque bands superimposed on an illuminated translucent background and modifying the ocular surface until the detected malformations are removed and the ocular surface conforms to the conjugate profile of the patient's corneal surface.

6 Claims, 2 Drawing Sheets

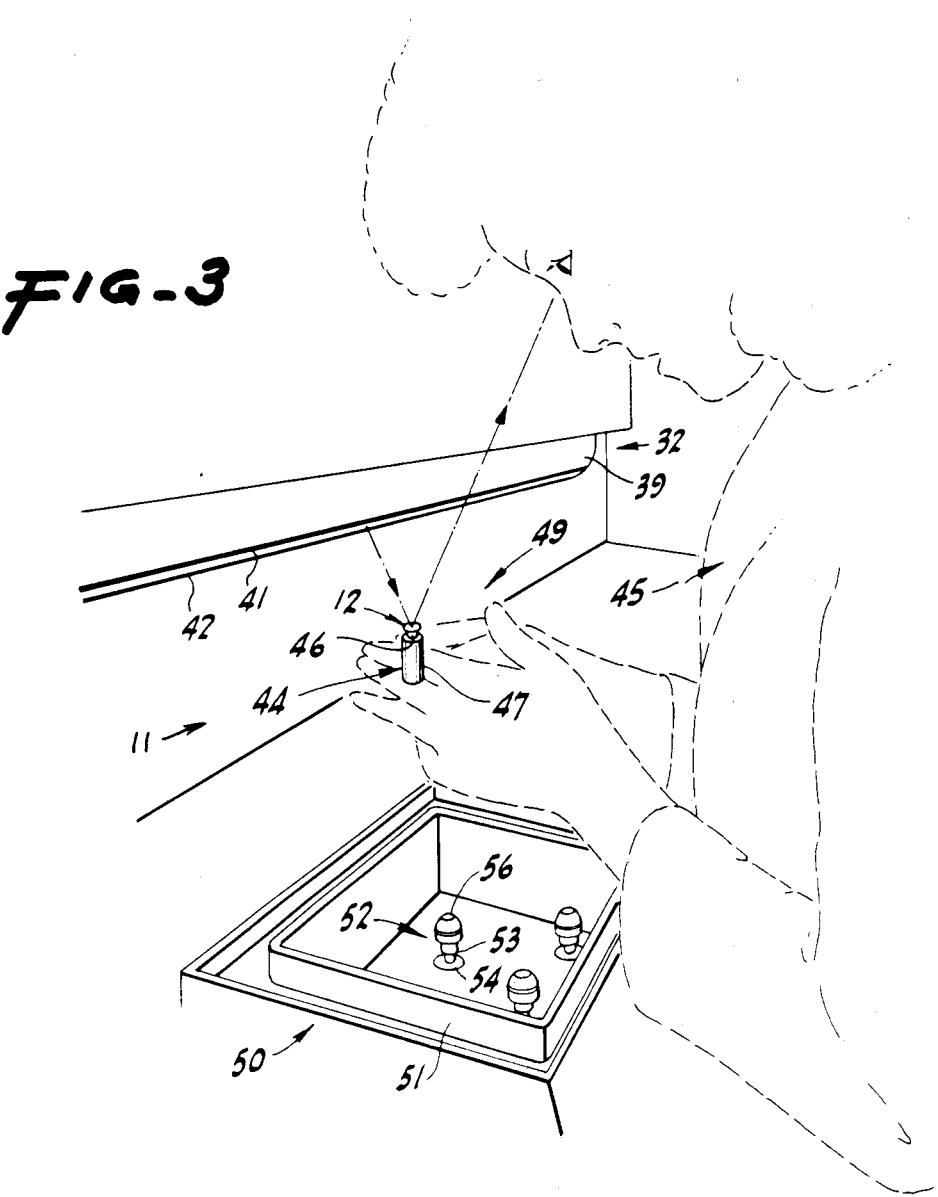
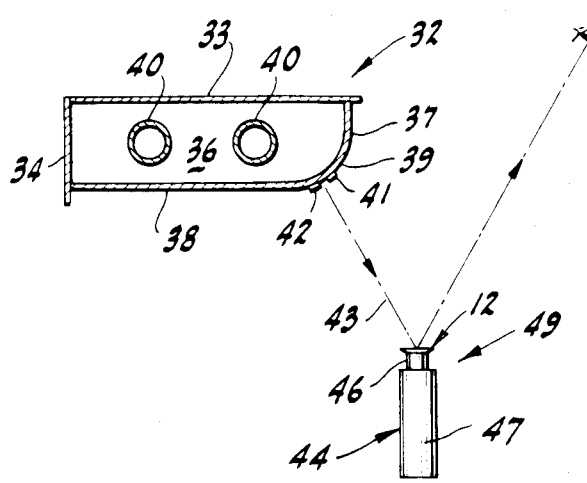

METHOD AND APPARATUS FOR DETECTING AND MODIFYING PERIPHERAL CURVES AND JUNCTION RIDGES IN CONTACT LENSES

BACKGROUND OF THE INVENTION

Specialists in the fitting of contact lenses often disagree as to the preferred procedure for analyzing and successfully modifying the peripheral curves, and their junction ridges which may exist on the back or ocular surface of such lenses.

In other words, contact lenses, as received by the specialist from the manufacturere, include not only the customery concave central curve, or base curve, which covers the pupilary surface of the eye, but also a peripheral portion comprising a secondary and sometimes a tertiary curve.

The peripheral curves are circular, curvilinear-in-section grooves formed in the back of the lens during manufacture. The junctions of the circular curves create ridges, which must ordinarily be eliminated by careful blending to fit the outer corneal surface of the eye in a comfortable fashion.

Radially outward from the peripheral portion, the lens margin recurves and rises slightly from the subjacent surface of the cornea to allow (1) tear fluid circulation beneath the lens and, (2) proper fitting of the lens on the cornea.

The corneal surface does not define a sphere. Instead, the corneal radius increases toward the edges resulting in a flattening of the surface. Thus, it is necessary to recurve the lens surface, to match the flattening of the cornea; otherwise, the lens would be too tight or would move on the corneal surface resulting in possible injury to the corneal surface.

Inasmuch as the peripheral poriton of the lens, as received from the manufacturer, frequently is not shaped to provide a comfortable fit, it is essential to be able to detect the presence, configuration and size of the peripheral curves in order to eliminate any surface malformations, which would lead to the wearer's discomfort, and to maximize tear circulation under the contact lens.

Heretofore, various expedients have been resorted to, such as inspecting the lens while it is held on a loupe and moving the lens-loupe combination back and forth against a light. While this technique will provide an experienced person with some indication of how well the curve junctions, or ridges, have been eliminated as a result of blending the peripheral portion of the lens, it gives no indication as to the radii of the peripheral curves, or grooves, bounded by the ridges. Accurate blending for maximum satisfaction is therefore impossible.

Still other procedures have utilized quite expensive optical systems of considerable sophistication and which are often time-consuming in use. Optical analyzers, furthermore, fail to provide an entire picture of the lens from edge to edge. This shortcoming is undesirable where, for example, a change is to be made in the percentage of central, or base curve, portion relative to the percentage of peripheral surface portion.

Of the following four patents turned up in a search, only the Koeniger patent is believed to be pertinent to the present device and process: Koeniger U.S. Pat. No. 3,794,429, 6/1974; McCormack, U.S. Pat. No. 3,820,899 6/1974; Padula et al., U.S. Pat. No. 3,917,391 11/1975; Volk, U.S. Pat. No. 4,149,801 4/1979.

Koeniger discloses a moderately complex system; and while its enclosed, magnification optics provide at least a partial profile capable of revealing malfomations. Koeniger's construction and operation are at substantial variance from the apparatus and method of the present invention.

SUMMARY OF THE INVENTION

The present device detects the shape of the ocular surface of a contact lens by reflecting on the ocular surface the image of one or more black lines, preferably linear, outlined against a contrasting background.

The contact lens to be inspected is held, preferably in a suction cup, so that the observer can readily and controllably move, tilt and rotate the lens toward and away from the black line image on a lamp, for example. This enables the observer to see the shape of the black line as modified by the curvilinear configuration of the ocular surface and, more particularly, as modified by the discontinuities in the otherwise smooth ocular surface caused by the intermediate and outer peripheral curves.

By slightly tilting or moving the lens to and fro, relative to the black bands, the entire surface of the lens is readily scanned; and by a combination of intermittent rotation of the lens about its own axis and of moving or tilting, the total relief, or profile, of the lens is quickly and accurately determined. This enables corrective action to be taken at once to eliminate malformations, especially in the peripheral portion of the lens.

The suction cup also affords a nicely controllable device for the blending of peripheral curves, and for the shaping and polishing of the lens to prepare the lens for a comfortable, trouble-free fit.

By physically locating the detecting and modification equipment next to each other, progress in modifying the ocular surface by conventional blending and polishing techniques can readily be verified by lifting the suction-held lens away from the modification equipment and repositioning the lens near the lamp to reflect the black line image.

BRIEF DESCRIPTION OF THE FIGURES OF THE DRAWING

FIG. 3 is a perspective view, schematically showing, approximately to scale, a preferred arrangement of lens inspection apparatus and lens modifying equipment, and illustrating, in broken line, an observer-operator holding a suction cup with contact lens mounted thereon;

FIG. 4 is a schematic transverse sectional view of the inspection, or detecting apparatus, illustrating the path of image transfer from source to lens to observer, the sizes and distances not being to scale;

DETAILD DESCRIPTION OF PREFERRED EMBODIMENT OF THE INVENTION

Figure 1:
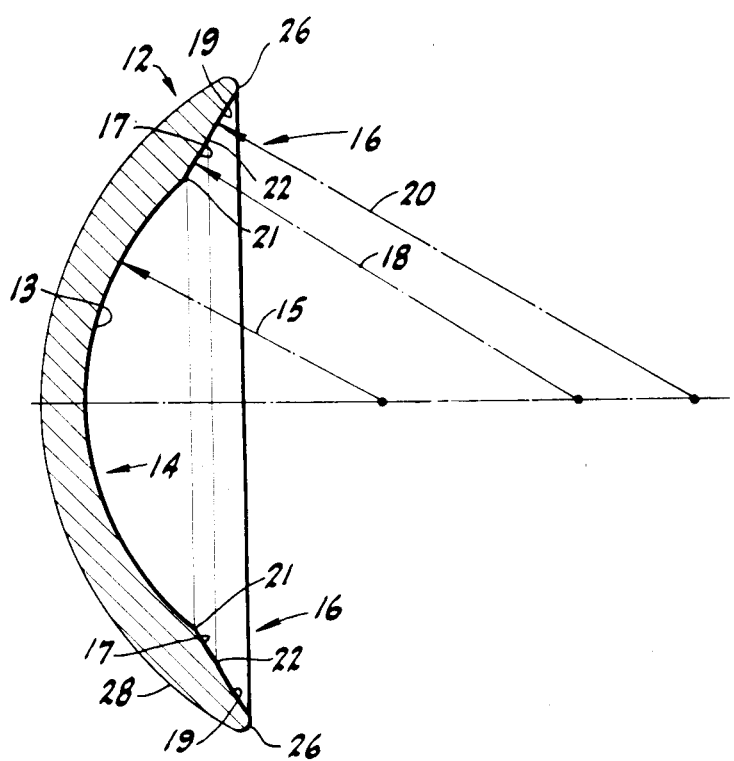
FIG. 1 is a median sectional view of a typical contact lens, taken on a diameter, as the lens may be received from the manufacturer.
Figure 2:
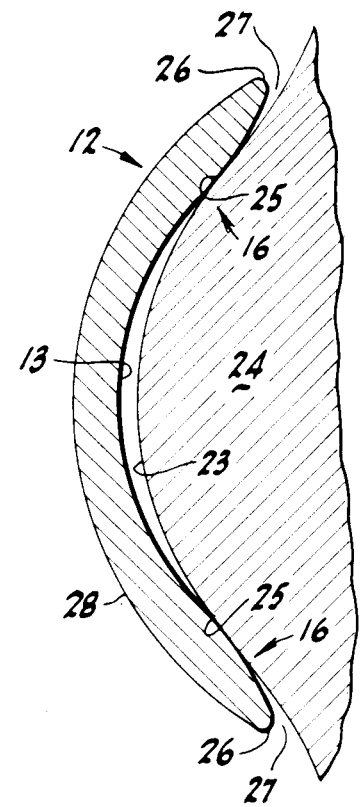
FIG. 2 is a view similar to that of FIG. 1, but with the peripheral curves blended, or modified, to eliminate malformations and comfortably to fit the cornea of a patient.

While the apparatus of the invention is susceptible of several different embodiments and the method of the invention can be practiced in various ways, the embodiment of the apparatus and the process disclosed herein have provided eminently successful results.

The apparatus of the invention, generally designated by the reference numeral 11, is used primarily for the detection, or observation, of malformations in transparent contact lenses of the kind worn to improve vision. The apparatus can be used not only on rigid, or hard, lenses, but also for soft lenses and in combination lenses that combine hard and soft components.

The customary contact lens 12, as received from the manufacturer, includes a bowl-shaped article of suitable transparent material, as appears most clearly in FIG. 1.

As is well known in the art, the inner, or posterior, or ocular surface 13 of the lens comprises a concave central, or base curve 14, or portion having a radius 15. The central portion of the lens covers the pupilary surface of the eye and provides the major optically corrective aspects of the lens.

Disposed radially outwardly from the base portion 14 of the ocular surface is an annular peripheral portion 16, which, in a lens as received from the manufacturer, often includes one or more shallow curves, such as a primary curve 17 with a radisu 18 and a secondary curve 19 with a radius 20, the curves defining, at their junction with the base curve 14 and with each other, respective ridges 21 and 22. The ridges 21 and 22 are collectively termed peripheral lines.

It is the peripheral portion 16 of the ocular surface 13 that engages the surface 23 of the cornea 24 of the eye, more particularly the annular band-like portion 25 of the corneal surface.

The outer, or marginal, or edge, portion 26 of the ocular surface of the lens is recurved to provide clearance. 27 between the corneal surface 23 of the eye and the adjacent ocular surface 13 of the lens. The clearance 27 affords a passageway for the movement of tear fluid to lubricate and moisten the lens and eye. The edge portion 26 merges into the front surface 28 of the lens.

As can be seen most clearly in FIG. 1, it is the peripheral portion 16 of the ocular surface 13 in which the peripheral ridges are located; and it is these discontinuities that cause the greatest discomfort to patients of a specialist in the fitting of contact lenses. The ridges, if not modified properly, physically press against the sensitive corneal surface of the eye with relatively high unit pressure and in some cases cause extreme discomfort to the wearer.

In order to relieve or obviate the discomfort, it is necessary to modify the profile of the lines and curves so as to blend them into a contour conforming to the shape of the wearer's corneal surface where contact occurs.

It follows that lens modification can successfully be accomplished only if the operator who effects the modification, using suitable abrading and polishing techniques, can clearly detect the shape, extent and location of the objectionable discontinuities in the ocular surface of the lens to be fitted.

In order to enable the operator quickly to detect and analyze the contour of the ocular surface of the contact lens and to judge what modifications to the lens surface are required in light of what is known concerning the objective and subjective signs and symptoms of the wearer, including the fluorescein pattern, we have provided a reflex, or reflective, system of detection.

The reflex system utilizes exterior illumination and requires no magnification optics, as contrasted with some of the prior art devices.

In a preferred embodiment, as appears most clearly in FIGS. 3 and 4, an elongated lmap 32 includes an opaque top 33, opaque back 34 and opaque ends 36. Preferably, although not necessarily, the lamp 32 is horizontal. Covering the front and bottom of the lamp is a translucent planar front shield 37 and a translucent planar bottom shield 38, the junction of the shields 37 and 38 being curved and continuous to form an arcuate-in-section shield portion 39. One or more sources of illumination such as fluorescent bulbs 40, are provided.

Along the arcuate-in-section, or curved shield portion 39, one or more, preferably two, continuous bands 41 and 42 of a contrasting material, such as black, opaque stripes, are provided. The bands 41 and 42 are parallel to the longitudinal elements of the shields 37, 38 and 39 and to each other.

In order to view the reflection of the opaque twin bands 41 and 42 and the contrasting background of the translucent shields most effectively, the contact lens 12 to be inspected is held in the upper end of a conventional suction cup 44 including a flexible annular head 46, which provides a seat for the front surface 28 of the contact lens, and a hollow flexible handle 47.

In order to mount the lens 12, the hollow handle 47 is gripped by the operator-observer 45 and lightly squeezed. After seating the front surface 28 of the lens in the cup head 46, the pressure on the handle is relaxed to allow the handle to return to full diameter. The "vacuum" thereby created within the hollow handle 47 firmly yet gently holds the lens in place.

The operator-observer, then moves the suction cup 44 and mounted lens toward the twin-band 41 and 42, directing the lens into close proximity to the bands. The suction cup is then tilted, if necessary, at such an angle toward the bands as to reflect the image of the bands and the contrasting background of the lamp shields onto the ocular surface of the lens, thence to the eyes of the viewer, as shown in FIGS. 3 and 4.

Figure 5:
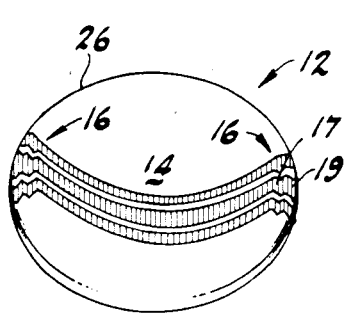
FIG. 5 is a perspective showing the appearance of a black line image as reflected from the ocular surface of an unblended contact lens as frequently received from the manufacturer, with sharp junctures between the base curve and the respective peripheral curves.
Figure 6:
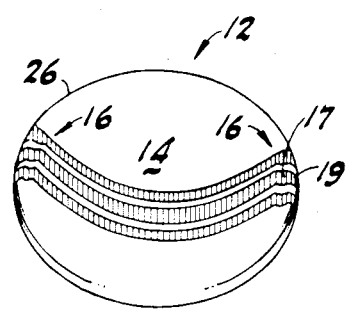
FIG. 6 is a view similar to that of FIG. 5, but with a partially completed blending of the curves; and, FIG. 7 is a view similar to that of FIG. 5, but with a finished blend.
Figure 7:
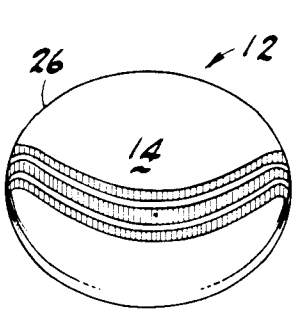

FIG. 5 illustrates the image which would be seen by the observer, in the case of a contact lens in the condition as sometimes received from the manufacture. In FIGS. 5, 6 and 7, the lens is positioned relative to the black bands 41, and 42 and the lamp 32 so that the bands extend across the entire diameter of the lens.

The banded image is reflected from the upwardly facing, ocular surface 13 of the lens and accruately reveals the contours, or relief features, on the surface, including discontinuation, if any.

To be noted, for example, is the smoothly arcuate central, or base, portion 14, where the twin bands are curved in a smooth, uninterrupted pair of parallel paths.

Proceeding radially outwardly from the curvilinear central portion 14, the profile of the peripheral portion, or zone of discontinuities 16, is readily disclosed by the zig-zag or jagged pattern formed as the incident image 43 (see FIGS. 3 and 4) is reflected from the peripheral lines or ridges existing at the junction of the curves.

Proceeding still further outwardly, the image resumes a smooth reverse curvature as the image is reflected from the ocular surface of the outer edge 26, or marginal, portion of the lens.

Since the zig-zag pattern disclosed by the detection equipment 49 replicates the ridges, or lines, in the zone of discontinuities 16, the oberver-operator 45 can immedately judge the location and extent of lens modification needed to eliminate the sharp junction lines and to blend the curves, i.e. smoothly to merge the central curve 14, the primary curve 17 and the secondary curve 19 with the beginning of the reverse curve of the outer edge, or marginal, portion 26 of the lens in such a manner as to provide maximum comfort and satisfaction to the patient.

By locating the lens modification equipment 50, including a modification bucket 51, or tray, in close proximity to the detection equipment 49, the operator can, after getting a "reading" on the lens discontinuites, invert the suction cup and place the inverted lens in contact with the appropriate one of the dome-shaped radius tools 52, or lens polishing tools, within the bucket 51.

It is the ability to use the suction cup-lens combination both for detecting discontinuities and for modifying them that marks a significant advance over the art known to applicants.

The radius tools 52 are conventional; and so a detailed description of such tools is not believed to be necessary. It is enough to say that such tools usually include a peg-like body 53 removably mounted on rotatable spindles 54 projecting upwardly through the bottom of the bucket 51, or tray, and controlled, for example, by a foot pedal, not shown. The top of the peg body 53 is rounded and supports an accurately radiused lens-modifying, or polishing, pad 56, of velvet material, for example.

By gently urging the suction cup and attendant lens downwardly against the pad 56, the unwanted material is polished away. Selection of a pad of appropriate contour is determined from experience, having reference to the corneal contour of the patient as ascertained in separate examinations performed in a manner well known in the art.

The initial radius tool 52 is of the blending type, so-called because its polishing pad is configured primarily to blend or smoothly merge the curves on the ocular surface as previously described.

The combined simplicity and efficacy of the present invention is particularly appreciated since, after a short period of blending, progress can be checked. To check progress, the operator need only lift the lens off the pad 56, invert the handle of the suction cup 44 and move the lens into image-observing position. If blending is not taking place in the area desired, the operator can shift to a radius tool which is either flatter or steeper in contour.

Blending continues, alternating between polishing and re-checking unitl the appropriate modification has been effected. By using various types of radii tools known in the art, and alternately polishing and re-checking with the detection equipment 49, not only blending, but lens curve and edge contour modifications can also be made in order to provide the best fit to the particular corneal profile of the patient.

It can therefore be seen that we have provided a lgith reflective system which enables an operator accurately to analyze and change the peripheral curves and edge contours on a contact lens. Not only can the curve width be judged, but also the radii. Lens material can be polished away, exactly where it needs to be removed and the ara can then be reblended to exact specifications. Since the lens is never removed from the suction cup in performing the operation, not only is the analysis and change in peripheral curves accurate, but extremely quick, as well. The results of the changes are observed on the cornea with the use of the conventional fluorscein pattern and, if necessary, further modifications can immediately be made.

What is claimed is:

1. Apparatus for directly observing contour of the ocular surface of a contact lens, comprising:
    a light source including a lamp and a light transmitting sheild provided with at least one light-obscuring band;
    means for selectively positioning the lens relative to the light source, with the ocular surface of the lens inclined toward and in proximity to said at least one band, whereby the ocular surface reflects the image of said band, which image is modified by peripheral ridges and curves on the surface.

2. An apparatus as in claim 1 in which said shield is elongated and includes a linear longitudinal element, and in which said band is linear and parallel to said linear element of said shield.

3. An apparatus as in claim 2 in which at least a portion of said shield is arcuate-in-section; and said band is located on said arcuate-in-section portion of said shield.

4. An apparatus as in claim 1 in which said lens positioning means includes a suction cup on which the front surface of the lens is seated, thereby exposing the ocular surface thereof.

5. Method for observing the contour of the ocular surface of a patient's contact lens, comprising the steps of:
    passing light through a light transmitting shield having at least one light-obscuring band thereon;
    positioning said contact lens such that the ocular surface thereof is adjacent said shield, and such that said light and the image of said band reflect from said ocular surface;
    directly observing the image of said band reflected from said ocular surface.

6. A method as in cliam 5 further characterized by the step of positioning the ocular surface of the lens into polishing engagement with a conventional radius tool until the contour of the ocular surface is polished to conform to the lens contacting portion of the patient's corneal surface.

* * * * *